Aug. 11, 1970

D. DUCLAUX 3,523,882

APPARATUS FOR CONTROL OF CONSUMABLE
ANODES IN ELECTROLYTIC SYSTEMS

Filed Feb. 25, 1969

INVENTOR
Daniel Duclaux
by McDougall, Hersh, Scott
and Ladd
Attys

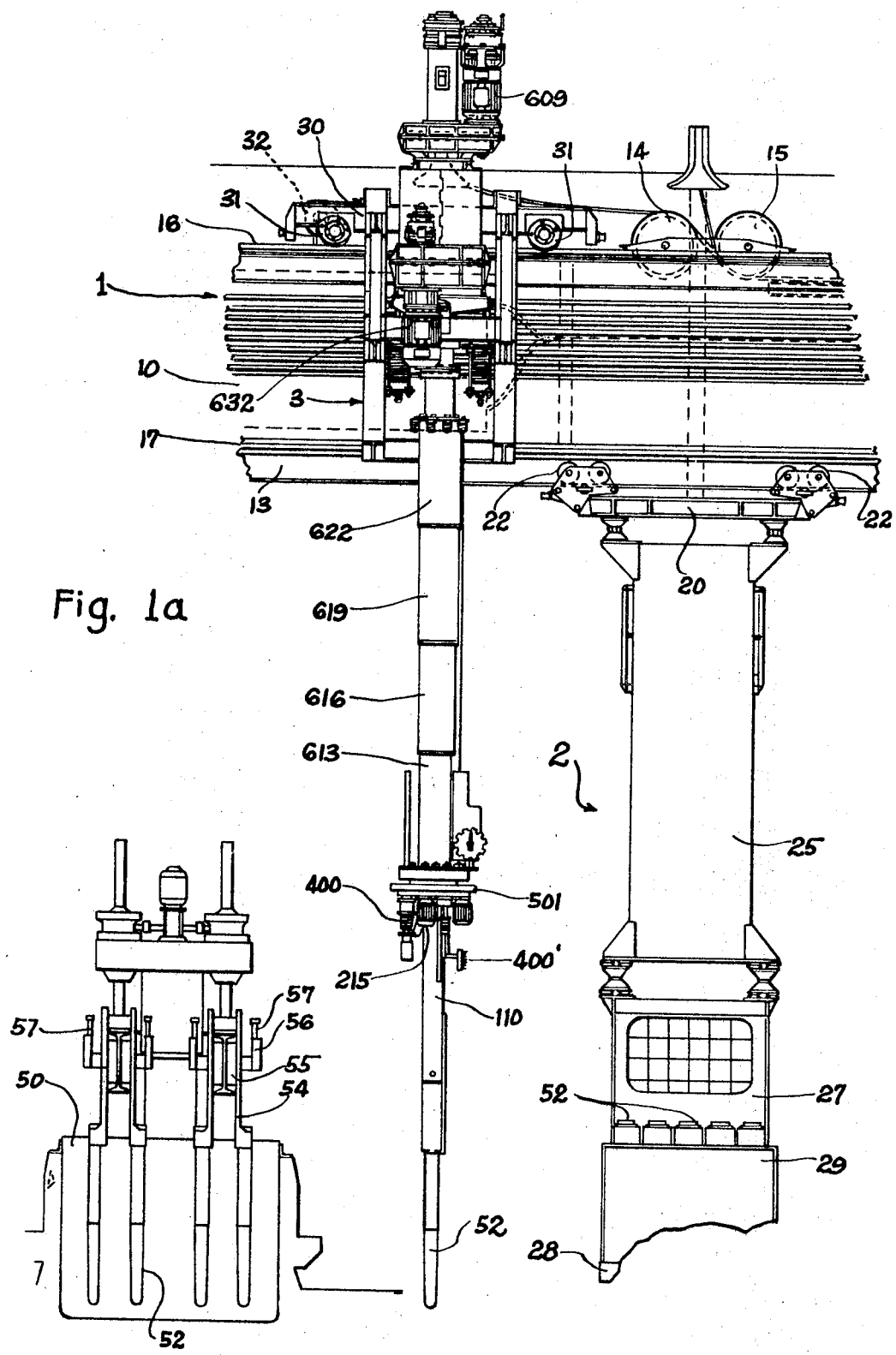

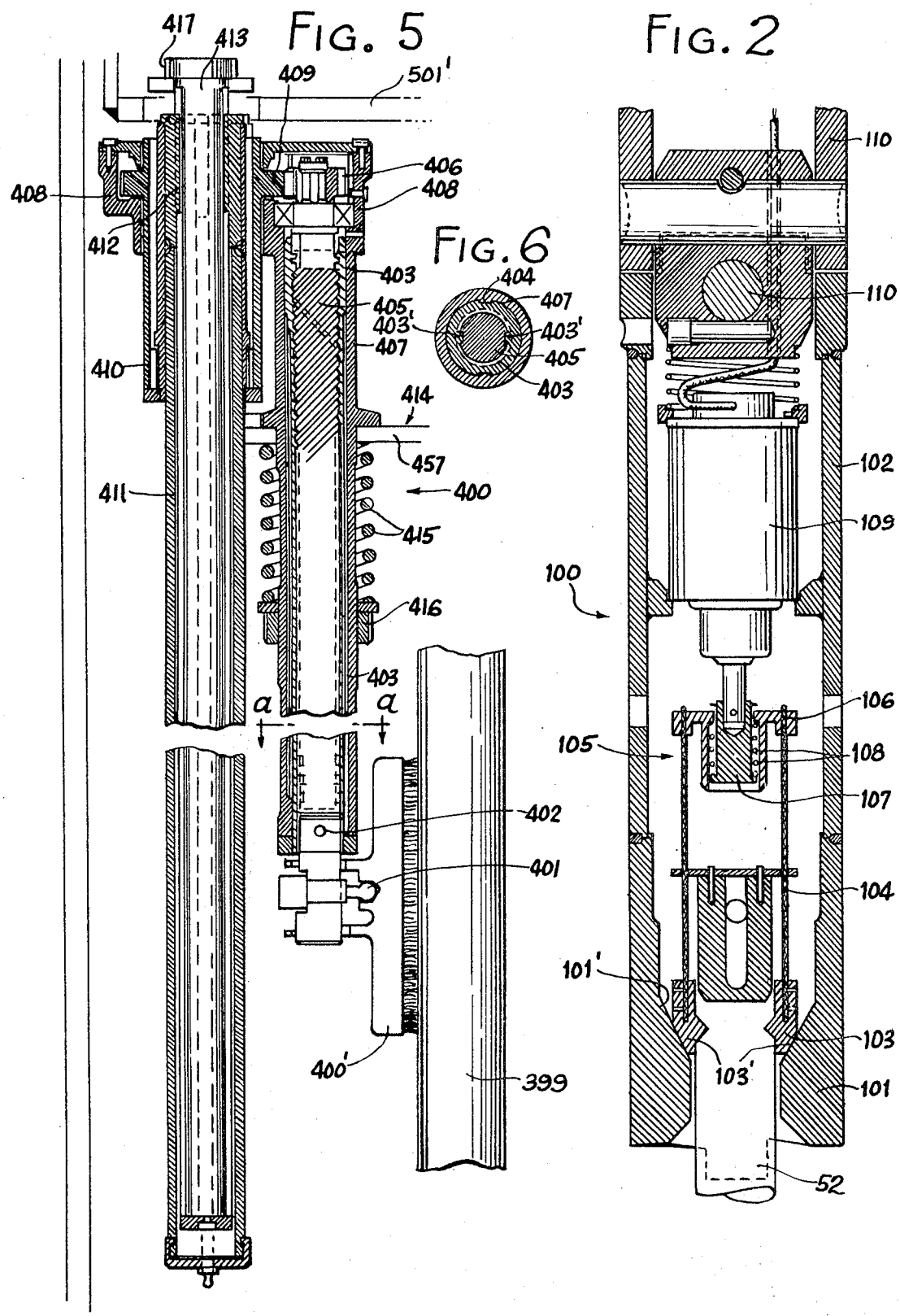

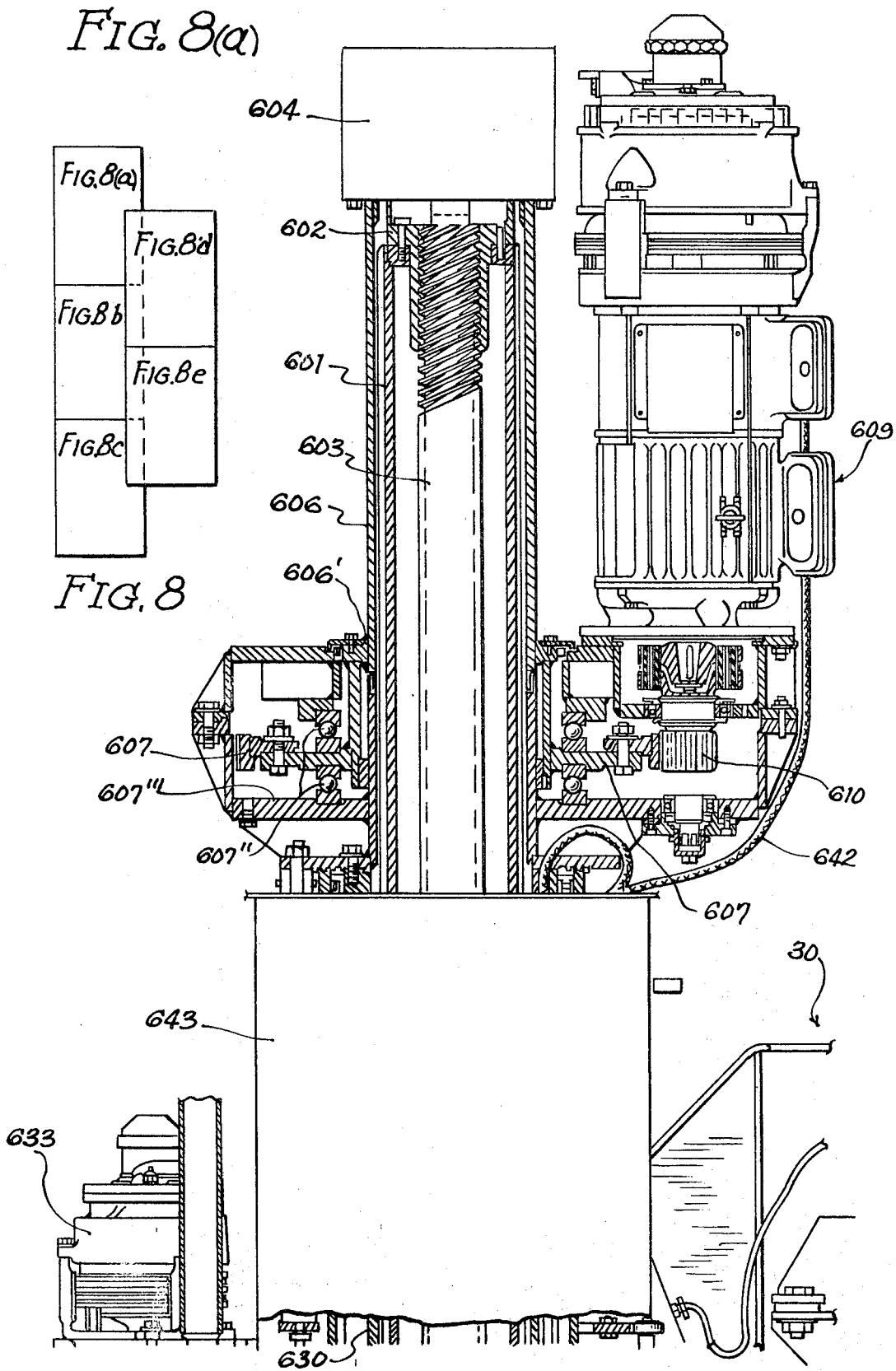

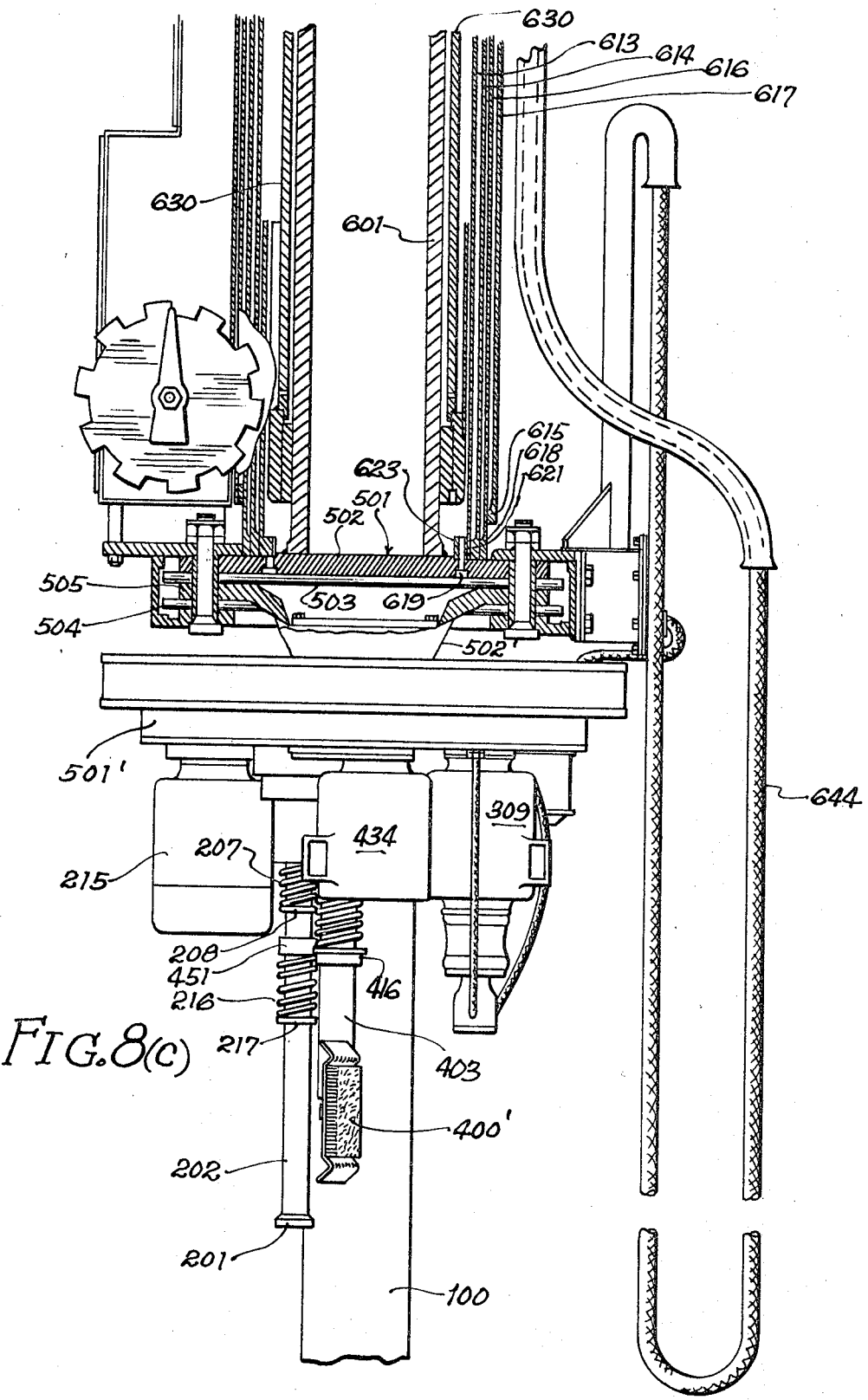

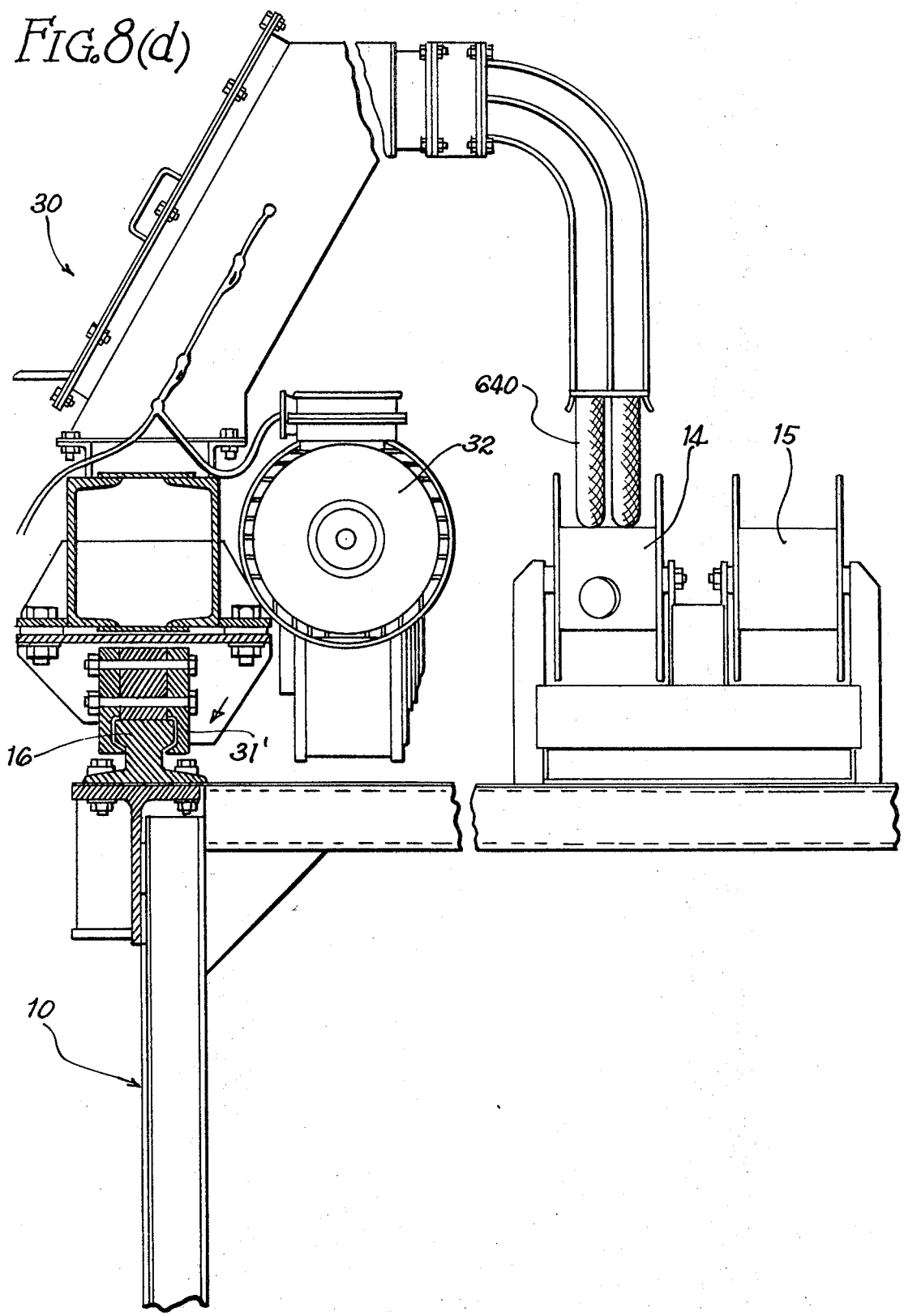

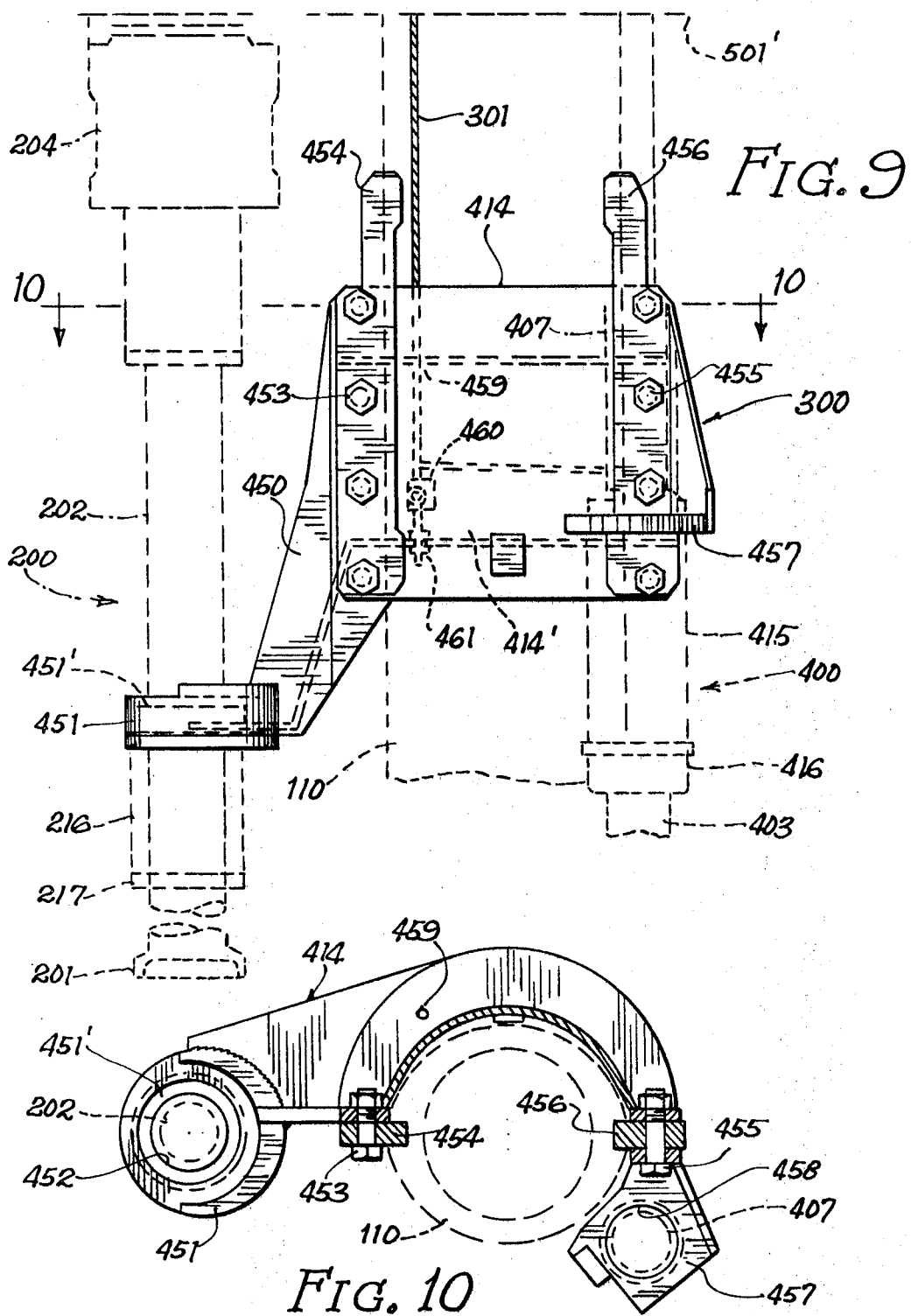

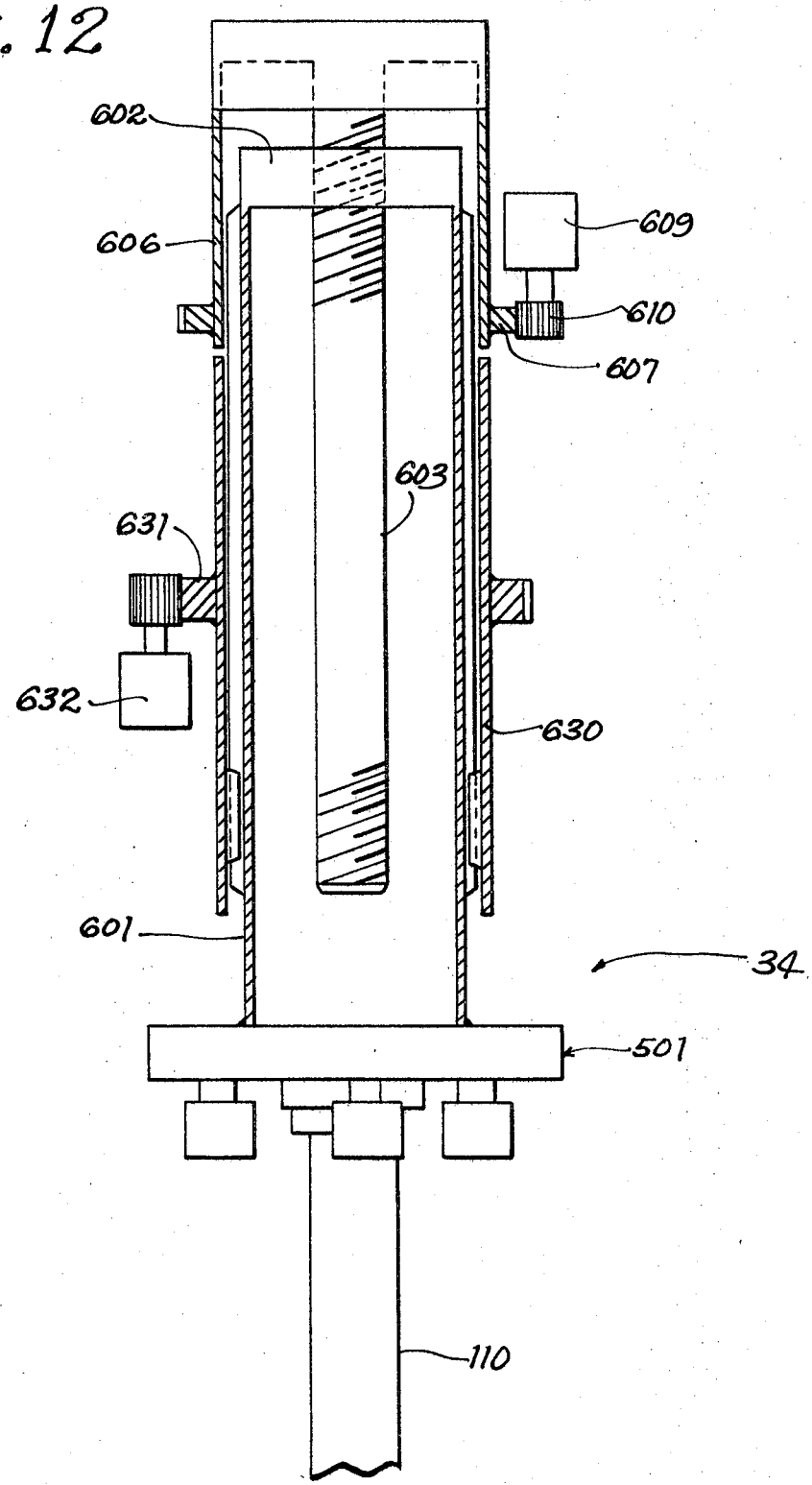

United States Patent Office 3,523,882
    Patented Aug. 11, 1970

1

3,523,882
    APPARATUS FOR CONTROL OF CONSUMABLE
    ANODES IN ELECTROLYTIC SYSTEMS
    Daniel Duclaux, Lille, France, assignor to Pechiney, Compagnie de Produits Chimiques et Electrometallurgiques, Paris, France
    Filed Feb. 25, 1969, Ser. No. 802,159
    Int. Cl. B66c 17/16
    U.S. Cl. 204—194       9 Claims

ABSTRACT OF THE DISCLOSURE

A control apparatus for a continuous Soderberg anode, the apparatus including a pin gripping device for withdrawing the anode pins from the anode; a device for actuating the pincer members which maintain mechanical and electrical connections between the pin stems and the current feed bars, the pincer actuating device being movable between operative and in operative positions; and a cleaning device for the current feed bars; the gripping, pincer-actuating and cleaning devices together constituting a sub-assembly, and means being provided for vertically moving and/or rotating this sub-assembly between operative and inoperative positions.

---

This invention relates to the field of electrolysis and more particularly to an electrolysis system which makes use of a continuous Soderberg anode.

A continuous Soderberg anode comprises a paste which is progressively solidified by baking with the heat evolved in the electrolysis basin or bath. The anode is displaced downwardly through a metal sheath, the latter of which is maintained at a substantially constant level. Part of the anode is consumed during the electrolysis and the consumed portion is regularly renewed by downward movement of the anode and by additions of paste to form the desired additions to the anode.

In use, a number of metal pins extend vertically into the paste. These pins have metal stems which, for example, may be formed of aluminum, and are connected by means of pincers to aluminum bars which form a part of the anode frame.

Means, such as jacks operating on a screw or other power actuating principle, are employed progressively to lower the frame and the enclosed anode as the anode is consumed.

When the anode has been lowered to a position at which the pins are approximately 20 cm. from the anode plane, the pins must be drawn out and raised for re-location in the upper portion of the anode and preferably in added paste portions which have not yet been baked.

For this purpose, the following procedures have been followed in the present practice of the process:

A pin-carrying basket is brought close to the electrolysis basin. The basket usually has an empty compartment and other compartments containing clean and cold pins which are ready for use. A pincer member, fixing the selected pin stem to its frame bar, is released and the pin is detached from the paste by a rotary movement, withdrawn and placed in the free compartment of the pin-carrying basket.

A clean pin is chosen from the basket and planted in the anodic paste. The frame bar is cleaned opposite the chosen location of the pin stem to insure as good an electrical contact as possible and the pincer member is again closed to connect the pin stem to the bar.

Pearson Pat. No. 2,964,459 illustrates an arrangement of the type described above. Specifically, the patentee refers to the insertion and removal of studs from anodes, the studs including integrally formed extensions which are attached to bus bar or electrodes by means of clamps.

Du Claux Pat. No. 3,093,369 discloses a clamping device of the type particularly suitable for use in conjunction with the apparatus of this invention. This clamping device includes a clamping member for holding an extension of a pin in electrical contact with a bus bar or electrode. The clamp member is moved into and out of clamping position through rotation of an actuating shaft. The actuating shaft includes a polygonal head portion which is adapted to be engaged by a tightening wrench for achieving rotation of the shaft.

Apparatus which has been employed to the present for effecting these functions has been subject to a number of objections. For example, apparatus has been proposed for withdrawing the pins and for re-locating them at a higher level. However, the movement of the pincer members and the cleaning of the contact surfaces on the frame bars were usually achieved by manual operation. This has the disadvantage that the operation is lengthy and tedious.

The withdrawal of the pin, particularly when the lower end portion is in the immediate vicinity of the anode plane, may cause a vigorous evolution of combustible gases which are immediately ignited by reason of the high bath temperature that is normally maintained, which may be as high as 1000° C. or above in the case of the electrolysis of alumina. In some cases, paste may fall through the opening left by the pin and may cause a small explosion. The operator is, therefore, subject to injury and the machine is subject to damage.

It is an object of this invention to provide a new and improved method and means for effecting the described functions without many of the disadvantages or objections encountered in present practice.

A further object is to provide a new and improved means for control and operation in the removal of pins and in the re-location thereof in an anode of the type described and for proper adjustment of the associated anode frames, and it is a related object to provide a method and means in which such operations can be carried out in a safe and efficient manner.

These and other objects and advantages of this invention will hereinafter appear and for purposes of illustration, but not of limitation, an embodiment of the invention is shown in the accompanying drawings, in which:

FIG. 1a is a side elevational view taken about the line 1a—1a of FIG. 1;

FIG. 2 is a sectional elevational view of a portion of the device forming a part of this invention;

FIG. 5 is a sectional elevational view of a still further portion of the device;

FIG. 6 is a sectional view along the line a—a in FIG. 5;

Figure 11:
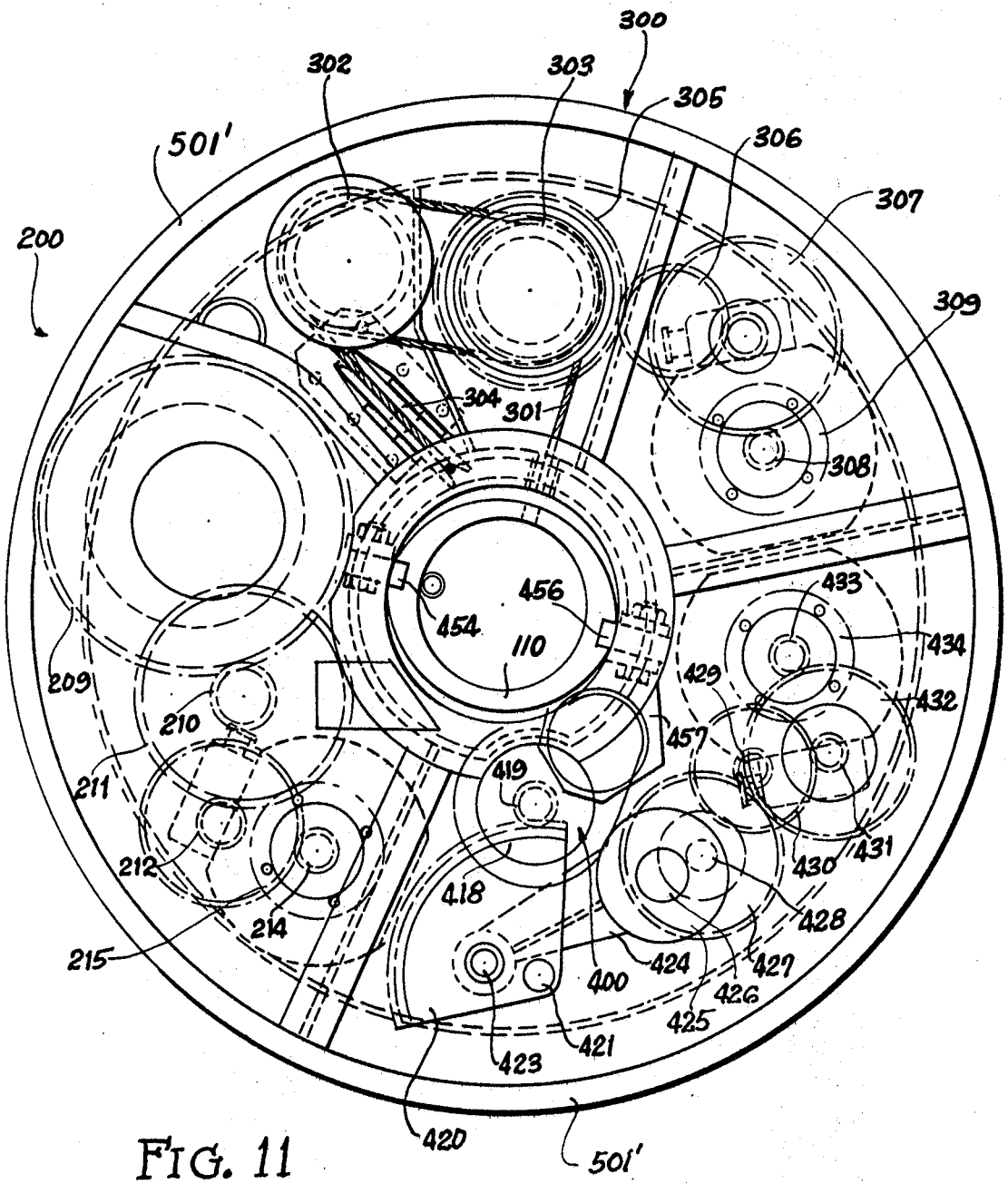

FIGS. 8a through 8e comprise sectional elevational views of the assembly which includes the devices of FIGS. 2 through 7;

FIG. 9 is a vertical elevational view of a bearing structure empolyed for moving elements of the invention into operating position;

FIG. 10 is a cross-sectional view taken about the line 10—10 of FIG. 9;

FIG. 11 is a diagrammatic illustration of the manner in which the various operating elements are disposed around a vertical axis of the construction; and, FIG. 12 is a diagrammatic illustration of the mechanisms employed for achieving vertical and rotational movement of the device support.

In accordance with the practice of this invention, there is provided a control apparatus for a continuous Soderberg anode, the apparatus including a pin gripping device for withdrawing the anode pins from the anode; a device for actuating the pincer members which maintain mechanical and electrical connections between the pin stems and the current feed bars, the pincer actuating device being movable between operative and inoperative positions; and a cleaning device for the current feed bars; the gripping, pincer-actuating and cleaning devices together constituting a sub-assembly, and means being provided for vertically moving and/or rotating this sub-assembly between operative and inoperative positions.

According to one aspect of this invention, the pin-gripping device is vertically movable and/or rotatable so as to transmit either or both movements to the pin.

According to another aspect of our invention, means are provided for controlling the various devices and their operating means from a single station at a certain distance from the electrolytic cell as required by the safety of the operator.

Briefly described, the device embodying the features of this invention is formed of three parts which are mechanically distinct and seperate, namely, (1) a rolling bridge which acts as a support, (2) a control assembly, and (3) an assembly of operating devices.

(1) The rolling bridge comprises a parallelepiped girder box which is highly rigid. Two I-shaped girders on the lower face of this box constitute suspension rails for the control assembly. A monorail on the upper face supports the assembly of operating devices and a side face has a support rail for this assembly.

A switchbox is housed within the girder box and, on the upper face of the box, two groups of pulleys receive electrical cables which link the control assembly to the operating assembly. The bridge is movable on side rails.

(2) The control assembly includes a control cabin for the operator in which the controls for the various parts of the apparatus are grouped. This cabin is extended by platforms for receiving various pin-carrying baskets.

Two articulated arms which are operated by a screw jack can displace the assembly of cabin and platform relatively to its equilibrium position so as to assist the loading and unloading of the backets. The upper ends of the arms and of the screw jack are articulated to an upper platform which carries rollers on which the control assembly is displaceable along the two rails which are provided for this purpose on the lower face of the bridge frame.

(3) The assembly of operating devices includes a carriage which carries the pin withdrawing apparatus and which is movable on a monorail fixed to the upper part of the rolling bridge and leans against a support rail fixed to the side face of the bridge.

The assembly also includes a device for rotating and rising and lowering a rotatable telescopic tube support, and a main electrical insulation device containing electrical and thermal insulation material which is resistant to high temperatures and linked by bolts which are also thermally and electrically insulated.

A support platform carries the lower mechanisms.

The pin-gripping device itself may be constituted by an upright key. Gripping jaws within the key slide on surfaces of inverted frusto-conical shape which are formed inside the key and are attached through cables and a damping device to an armature on which an electro-magnet is arranged to act.

A tightening and untightening key or wrench for the pincer members insures electrical contact between the pin stems and their current feed bars. This key is constituted by a channelled tube with a key-shaped end, and is raised and lowered by means of cables and an electric motor.

A cleaning device for the feed bar stems may be constituted by a brush which is reciprocated by a rotary drive and a slider crank mechanism.

Figure 1:
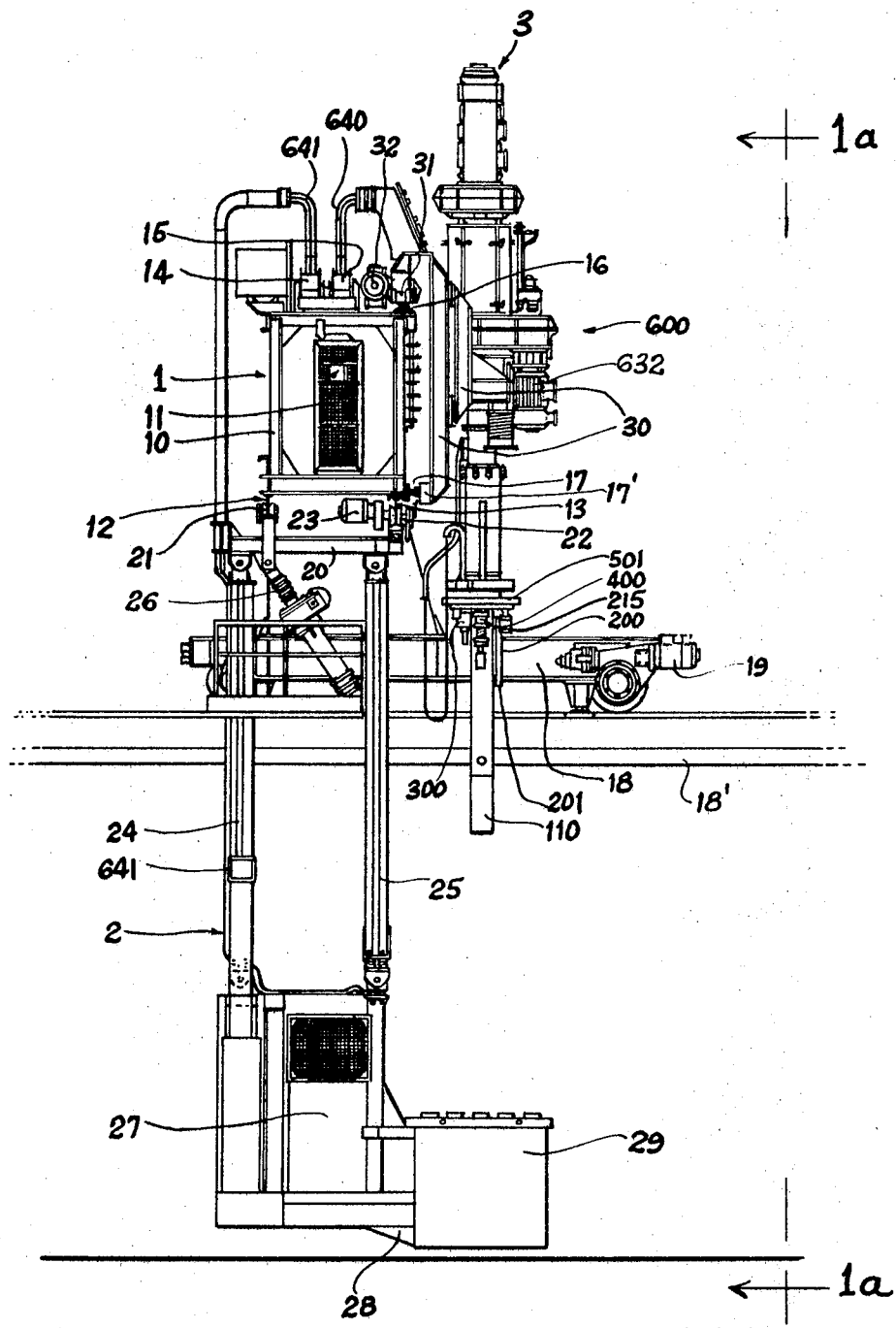
FIG. 1 is an elevational view of a control apparatus embodying the features of this invention.

Referring now specifically to the drawings, the apparatus shown generally in FIG. 1 includes a rolling bridge 1, a control assembly 2, and an assembly 3 of operating devices.

As shown in FIG. 1a, the apparatus is adapted to be employed in conjunction with a continuous Soderberg anode 50. This anode includes a plurality of pins 52 which are to be handled in accordance with the concepts of this invention. The pins include extensions 54 which are adapted to be attached to bus bar or electrode 55 by means of pincers 56. The pincers includes shafts 57 of the type described in the aforementioned Du Claux patent whereby rotation of the shafts about their vertical axes will permit tightening and loosening of the pincers.

It will be understood that the anode structure, the pin structure, and pincer members, and the control heads comprise conventional elements and do not form a part of the instant invention. Similarly, the manner of gripping the pins and the manner of actuating the pincer members is conventional, as is the use of brush means as the means for cleaning the stems of the current feed bars associated with the anode is conventional. As will appear, the instant invention is directed to the provision of novel assembly means which are adapted to perform these operations and other operations in an automatic and uniquely efficient manner.

The bridge 1 includes a girder box 10 which carries at one end a switchbox 11. I-shaped bars 12 and 13 on the lower face of the girder box 10 provide suspension rails for the control eessembly 2. Pulley wheels 14 and 15 for carrying electric cables and a monorail 16 for supporting the assembly 3 are carried on the upper face of the box 10. A support rail 17 is carried on the side face of the girder box which is adjacent to the assembly 3.

The girder box 10 is supported at its ends by a pair of carriages 18, one of which is shown in FIG. 1. The carriages move on rails 18' and at least one carriage is driven by an electric motor 19.

The control assembly 2 includes a supporting chassis 20 which carries pairs of suspension rollers 21 and 22 which roll along the suspension rails 12 and 13, respectively. The rollers 22 are controlled by an electric motor 23.

Vertical supports 24 and 25 are articulated to the chassis 20 at their upper ends and are acted upon by a screw jack 26. The rods 24 and 25 carry at their lower ends a control cabin 27 which is extended by a platform 28 for receiving pin basket 29.

The device assembly 3 includes a supporting chassis 30 which carries two rollers 31 running on the rail 16. The chassis 30 is driven by an electric motor 32, the operation of which displaces the device assembly 3 along the bridge 1 independently of the movement of the control assembly 2. Guide members 31' (FIG. 8d) may be positioned adjacent the rollers 31 to insure stability of the chassis 30 on the rail 16.

A roller 33 on the chassis 30 runs on the supporting rail 17 of the box 10 (FIGS, 1 and 8e), and the device carrying part of the apparatus is suspended on this chassis. The device carrying part comprises the entire assembly of operating devices and is suspended from the chassis 30 for movement therewith.

The device carrying part includes a support plate 501 which supports various operating devices utilized in the operation of the construction of this invention. Specifically, the support 501 carries the main pin drawing key generally designated 100, the key for tightening and untightening pincer members generally designated 200, the brushing device generally designated 400, and the mechanism 300 which includes means for raising and lowering the devices 200 and 400 (see FIGS. 8c and 9).

Figure 8B:
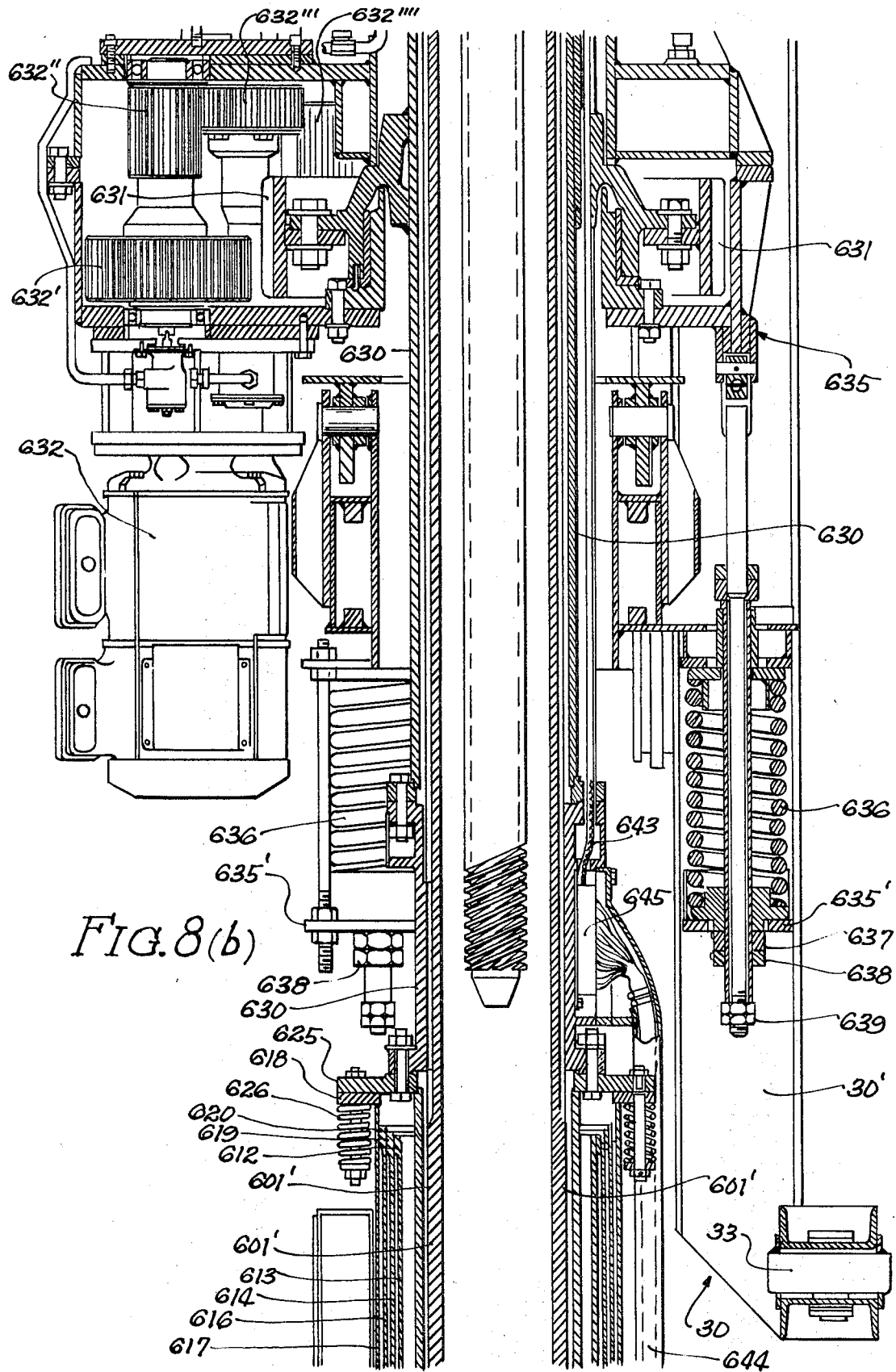
FIG. 8 is a diagram illustrating the relationship of FIGS. 8a through 8e.
Figure 8E:
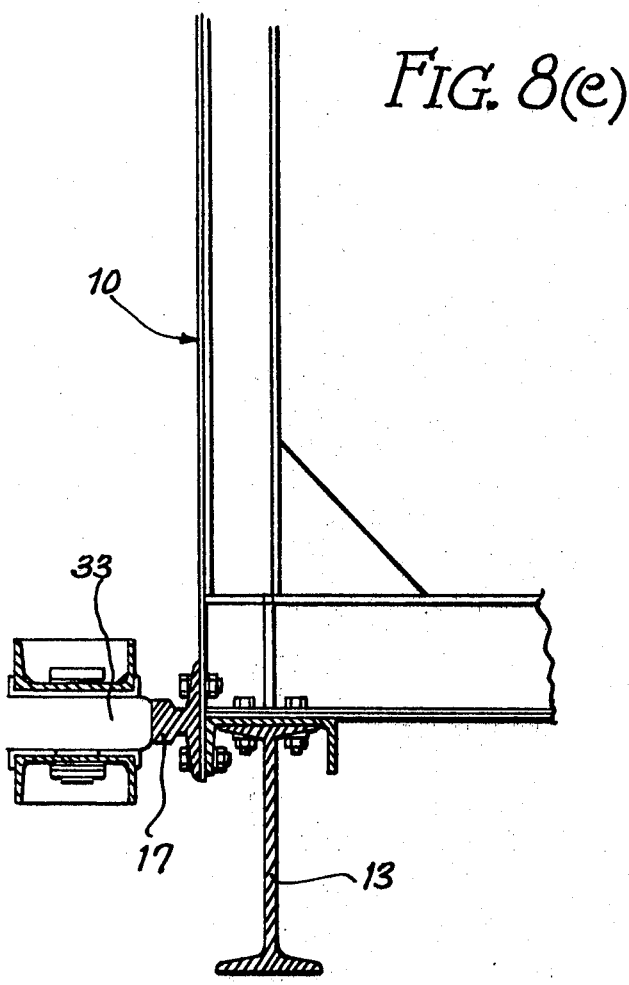

FIG. 12 illustrates diagrammatically the basic operation of the part 34, particularly motors 609 and 632 which control vertical and rotary movements of the the support 501, respectively. FIGS. 8 through 8e show this structure in detail. The support 501 carries additional motors for the operation of respective parts 200, 300 and 400.

The motor 609 drives the gear 610 which meshes with the gear 607 tied to the cylinder 606. As best shown in FIG. 8a, the gear 607 is tied to the cylinder 606 through the short cylinder 607' and dust seal member 606'. Bearings 607'' and plate 607''' provide the necessary support.

Attached to the upper end of the cylinder 606 is a screw 603. A suitable torque limiting clutch is located in the housing 604 and is interposed between the upper end of the cylinder 606 and the screw 603.

The screw 603 is received by a nut 602 which is secured to the upper end of the inner cylinder 601. The bottom end of the cylinder 601 is tied to the plate 501 (FIG. 8c) whereby operation of the motor 609 will cause rotation of the outer cylinder 606 and the screw 603 to raise and lower the support plate 501 along with the operating devices carried by the support plate.

The second motor 632, through a gear train including gears 632', 632'', 632''' and 632'''' (FIG. 8b), drives a gear 631 which is tied to the outer cylinder 630. The cylinder 601 is provided with ribs 601' which interfit with internally channelled portions of the cylinder 630 whereby rotation of the cylinder 630 will impart rotary movement to the cylinder 601. This will in turn provide for rotation of the support plate 501.

The ribs formed on the exterior of the cylinder 606 are shown at 634, and the channels in the cylinder 630 are located at 635.

As noted, the motor 609 is supported on a horizontal plate 607'''. This plate is secured to the outer cylinder 627 which is tied to the outer cylinder 630. Electrical connections for the motor 609 are provided through line 642 extending from the housing 643. Conventional rotary contacts may be located in the housing so that connections will be maintained as the motor 609 and its supports rotate during rotation of the outer cylinder 630. It will be understood that compensating drive can be readily applied to the motor 609 so that the vertical position of the plate 501 can be controlled during rotation of the cylinder 630.

A plurality of telescopic tubes 613, 614, 616 and 617 are provided for protecting the cylinder 601 when the cylinder is exposed due to downward movement. As shown, the upper end of the tube 617 is attached at 618 (FIG. 8b) while the lower end of the tube 613 is attached at 619 to the support 501. As the cylinder is lowered, the tubes provide a continuous shield.

The support 501 includes a plate 502 which plate is bolted to a member 502'. Insulating material in the form of discs 503 and 504 are interposed between the member 502' and plate 502 and its downward extensions 505 so that the member 502' and the elements below it will be insulated from the plate 502 and all of the elements above this plate.

Located on the bottom of the plate 501 is a housing 501' which carries the operating devices referred to. FIGS. 3, 4, 5 and 7 illustrate extended sectional views of the housing 501' indicating the manner in which certain elements of the operating devices are operatively connected. FIG. 11 is a plan view of the housing illustrating the actual physical relationship of the various elements shown in FIGS. 3, 4, 5 and 7. The housing 501' is directly connected to the support plate 501 through member 502' so that the housing will be raised and lowered along with the support plate in response to the movement of the inner cylinder 601.

The housing 501' includes means for suspending a cable 301, and a bearing element 414 ,FIG. 9) is attached at the end of this cable. The bearing element defines an opening 459, and the cable extends through this opening to a clamp means 460 which is attached at 461 to the bearing element. This bearing element 414 will move vertically along with the housing 501'. In addition, the bearing element can be raised and lowered relative to the housing 501' by raising and lowering the cable 301.

As shown in FIGS. 9 and 10, the bearing element includes a first downwardly disposed leg 450 having an end portion 451 which defines central opening 452.

The leg 450 is attached by means of bolts 453, and vertical bar 454 is held in place by these bolts. Bolts 455 secure a similar vertical bar 456 on the opposite side of the element, and a second leg 457 defining a central opening 458 is also carried by the bearing element. The vertical bars 454 and 456 are received by grooves defined in the side walls of the tube 110. When the element 414 is raised and lowered in response to movement of the cable 301, the combination of the bars 454 and 456 and the corresponding grooves provide guide means for the bearing element.

Figure 4:
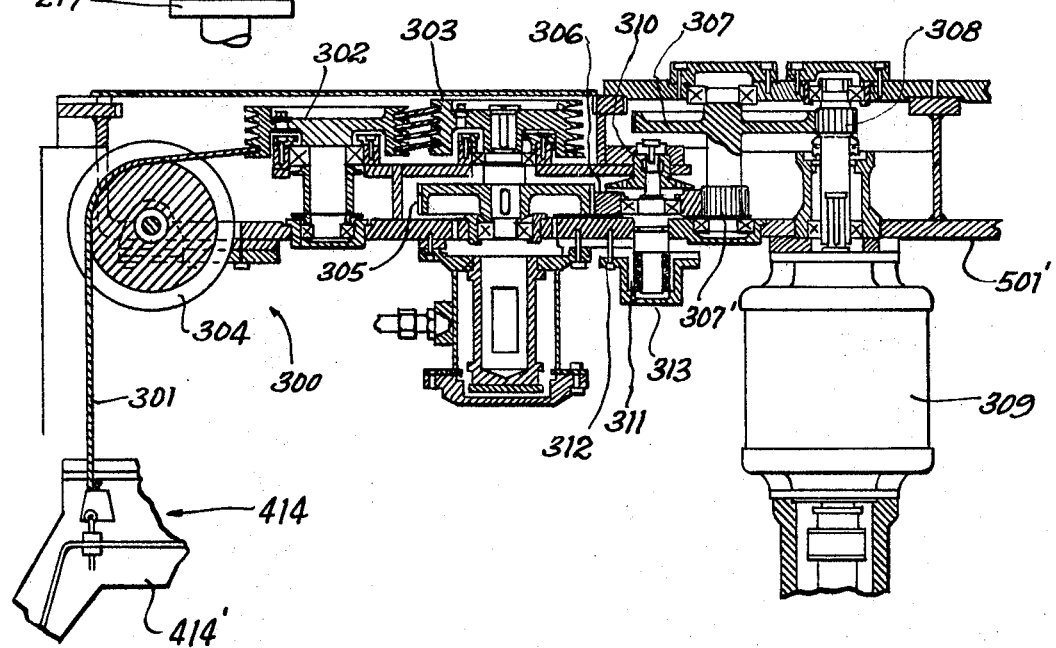
FIG. 4 is a sectional elevational view of still another portion of the device.

FIGS. 4 and 11 illustrate the means employed for driving the cable 301. It should first be noted in this connection that the bearing element 414 will move downwardly under its own weight when the cable 301 is unwound. Upward movement of the bearing element occurs during rewinding of the cable.

Winding and rewinding of the cable is achieved through operation of a motor 309 which extends downwardly from the bottom surface of the housing 501'. This motor drives the gear train comprising gears 308, 307 and 307'. The gear 307' is a parasitic gear operating to drive the gear 305 which is connected to pulley 303. The cable 301 extends over guide pulley 304 to multi-groove idler pulley 302 and then to the ulti-groove drive pulley 303. The shaft of the gear 306 is also connected to the member 350. By tightening the annular springs 311 through bolts 312 and cap 313, the friction applied to the gear 306 can be changed to thereby provide a braking effect. This also provides a torque-limiting arrangement.

Figure 3:
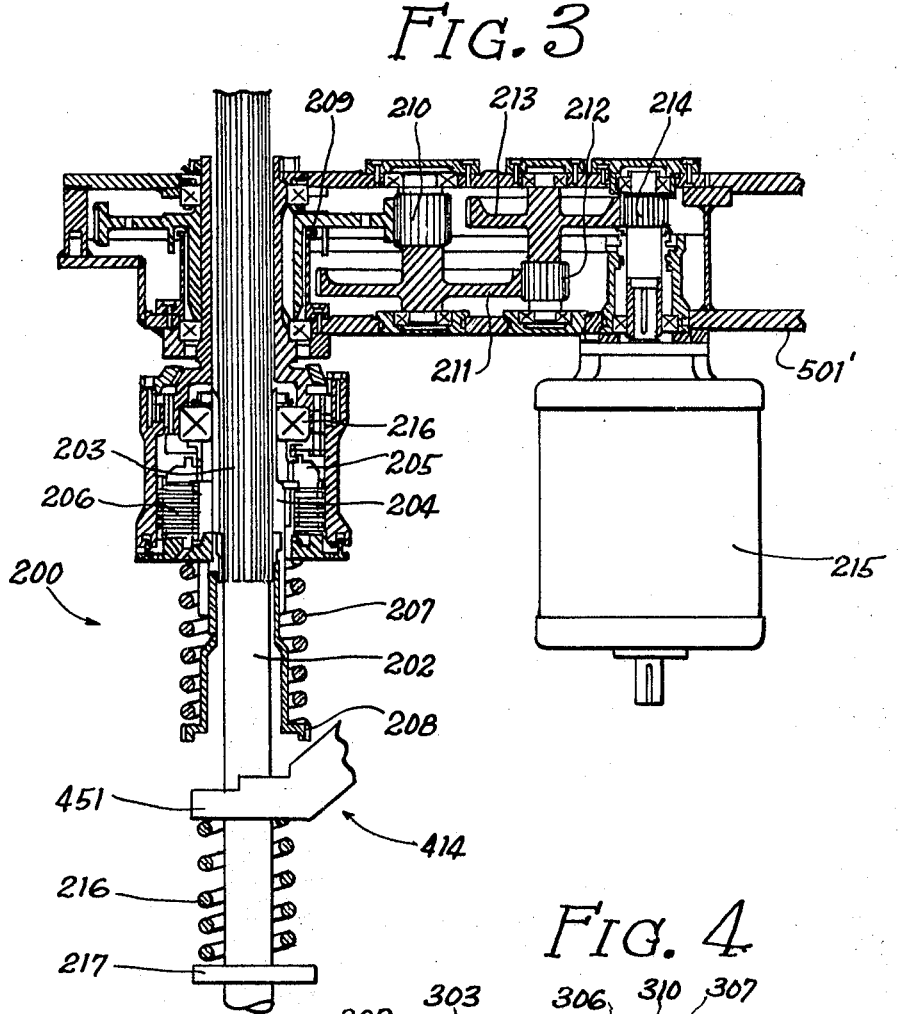
FIG. 3 is a sectioinal elevational view of another portion of the device.
Figure 3A:
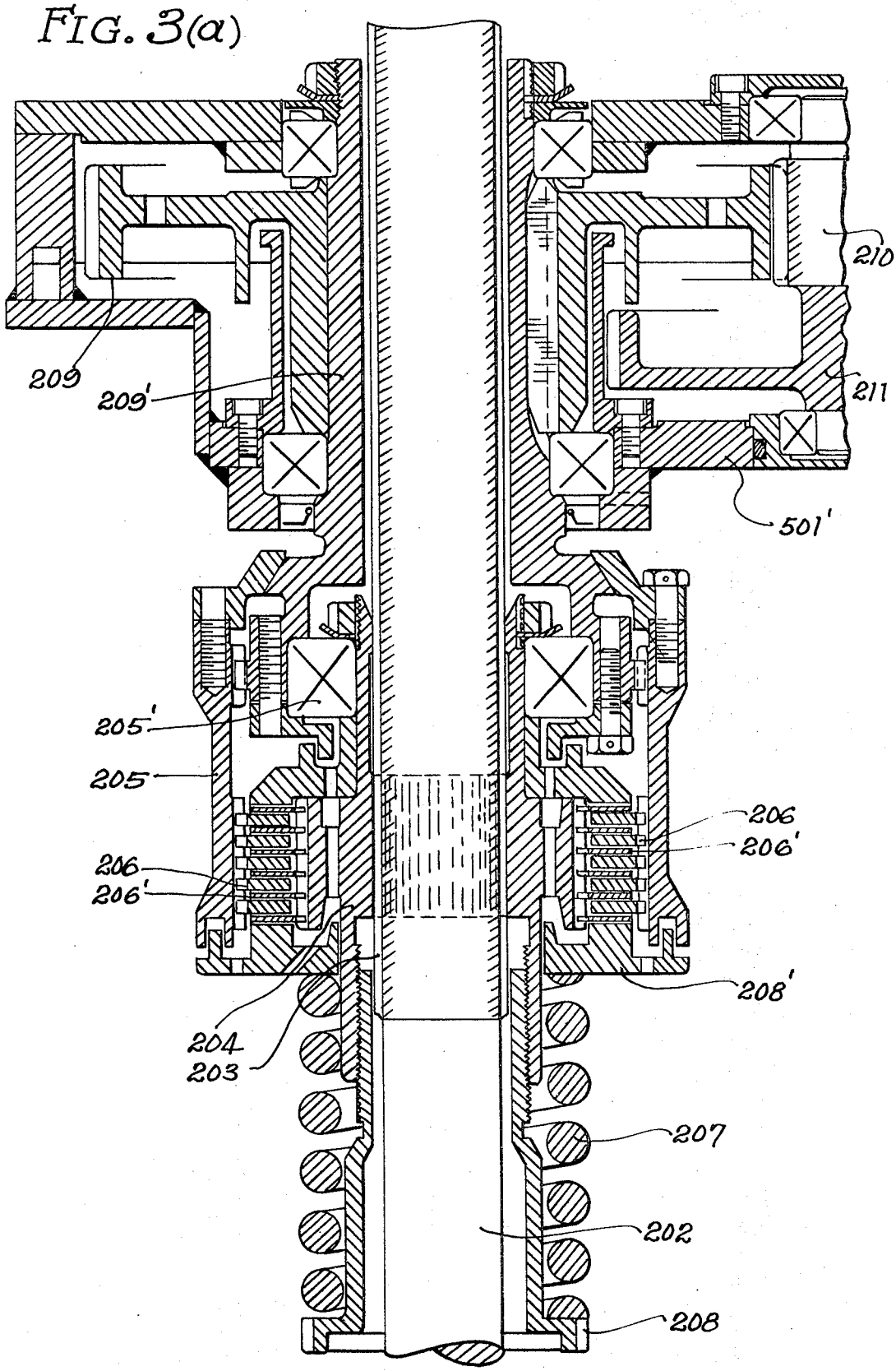
FIG. 3a is an enlarged sectional view illustrating certain details of the structure shown in FIG. 3.

As shown in FIGS. 3 and 3a, the shaft 202 is splined, and the shaft is connected to the end 451 of the leg 450. This shaft will then move up and down with the bearing element 414. A shoulder 451' (FIGS. 9 and 10) is formed on the shaft 202 and seats within the end 451 to provide the necessary connection during upward movement. Force for downward movement is imparted through spring 481 supported by shoulder 482.

The cylinder 411 (FIG. 5) is also attached for reciprocal movement due to the splined connection with shaft 413. The cylinder 407 is attached to the cylinder 411 and the leg 457 imparts vertical movement in the same manner through the spring 415 and shoulders 416 and 416'.

Reference will now be made to the specific operation of the various devices carried on the support 501.

The main pin drawing key 100 of the part 34 is shown in detail in FIG. 2. This key consists of a tube composed of an anti-magnetic metal of high resistance. The machined lower end 101 of the tube is welded to the non-machined upper end 102.

Jaws 103 also composed of an anti-magnetic metal have abutments $103_2$ formed thereon which slide along frustoconical surfaces 101' formed within the lower end 101 of the key 100.

The jaws 103 are linked by four cables 104 to a damping device 105 which includes a cable support 106. A cylindrical slider 107 moves within an inner tube forming part of the support 106, and a compression spring 108 is held between flanges on the slider 107 and the support 106, respectively. The slider 107 is connected to a magnet 109 within the upper end 102 of the key 100. The key itself is connected to a tube 110 by a cardan joint which allows the inclination of the key to be controlled to some extent. Although a joint of this kind is preferred, it is not, however, essential.

The device 200 (shown in detail in FIGS. 3, 3a and 9 and 11) of part 34 is provided for tightening and untightening the pincer members which insure electrical contact between stems on the anode pins and the current feed bars. The device 200 is mounted on support 501 and includes a vertical shaft 202, the head of which comprises a key or wrench 201( FIG. 9).

As explained in Du Claux U.S. Pat. No. 3,093,369, a wrench may be used for rotating the head portion of the clamping device and the key 201 serves the function. More specifically, the wrench or key 201 will fit over the vertically extending head identified by the numeral 8 in the De Claux patent to rotate the shaft 7 of Du Claux about its vertical axis. This action will clamp or release the pin stem or bar identified by the numeral 2 in the Du Claux patent which is equivalent to the shaft 57 shown in FIG. 1a of this application.

The upper part of the tube 202 is provided with ribs 203 which engage with a guide member 204. The guide member 204 is operatively connected to a drive member 205 by means of a torque-limiting device constituted by plates 206 and 206'. The plates 206' are tied to the guide member 204 and the plates 206 are tied to the drive member 205. The maximum torque transmitted depends on the contraction of spring 207 which is controlled by means of a nut 208. Rotation of the nut moves the plate 208' to loosen or tighten the plates 206 and 206'.

A bearing 205' is interposed between the members 204 and 205 to permit relative rotation when the torque limit is exceeded. The drive member 205 is tied to a toothed wheel 209 through cylinder 209'. The wheel 209 is driven through gearing 210–214 (FIGS. 3 and 11) constituting reduction gearing, by a motor 215.

A spring 216 is interposed between the bottom of leg 451 and flange 217 carried by the tube 202. This arrangement reduces the possibility of damage when the key 201 is lowered into engagement with the head portion of the clamp.

As explained, FIG. 4 shows the mechanism 300, also mounted on support 501', for raising and lowering bearing 414 which controls vertical movement of the key 201 and the brush 401. The mechanism 300 raises and lowers the cable 301 which is attached to the transverse section 414' of the bearing element 414.

FIGS. 5 to 7 and 11 show the brushing device 400, also mounted on support 501', which reciprocates the brush 400'. This brush 400' is mounted on a ball and socket joint 401 at the lower end of an internally threaded tube 403 which is vertically reciprocated. An externally threaded rod 405 is rotatable within the tube 403 in meshing relationship therewith. As this rod rotates, the tube 403 will move up or down. By continuously reversing the direction of rotation, in a manner to be explained, the brush will reciprocate. An internal key 404 on an outside protection sleeve 407 (see FIG. 6) constrains the tube 403 to linear movement under the effect of the rotation of the rod 405.

The rod 405 is provided with a driven pinion 406 at its upper end which meshes with a drive gear 409. The two gears are contained within a housing 408.

The gear 409 is integral with a sleeve 410 which in turn is tied onto a tube 411. The upper end of the tube 411 has ribs 412 which engage within the grooves of the grooved shaft 413 housed within the tube 411 and slideable therein.

The tube 407 is supported by the leg 457 of bearing 414. Accordingly, vertical position of this bearing determines the position of the sleeve 407 since the tube 411 will slide up and down as the bearing moves the tube 407. A spring 415, the compression of which is regulated by a nut 416, serves as a damping means.

Figure 7:
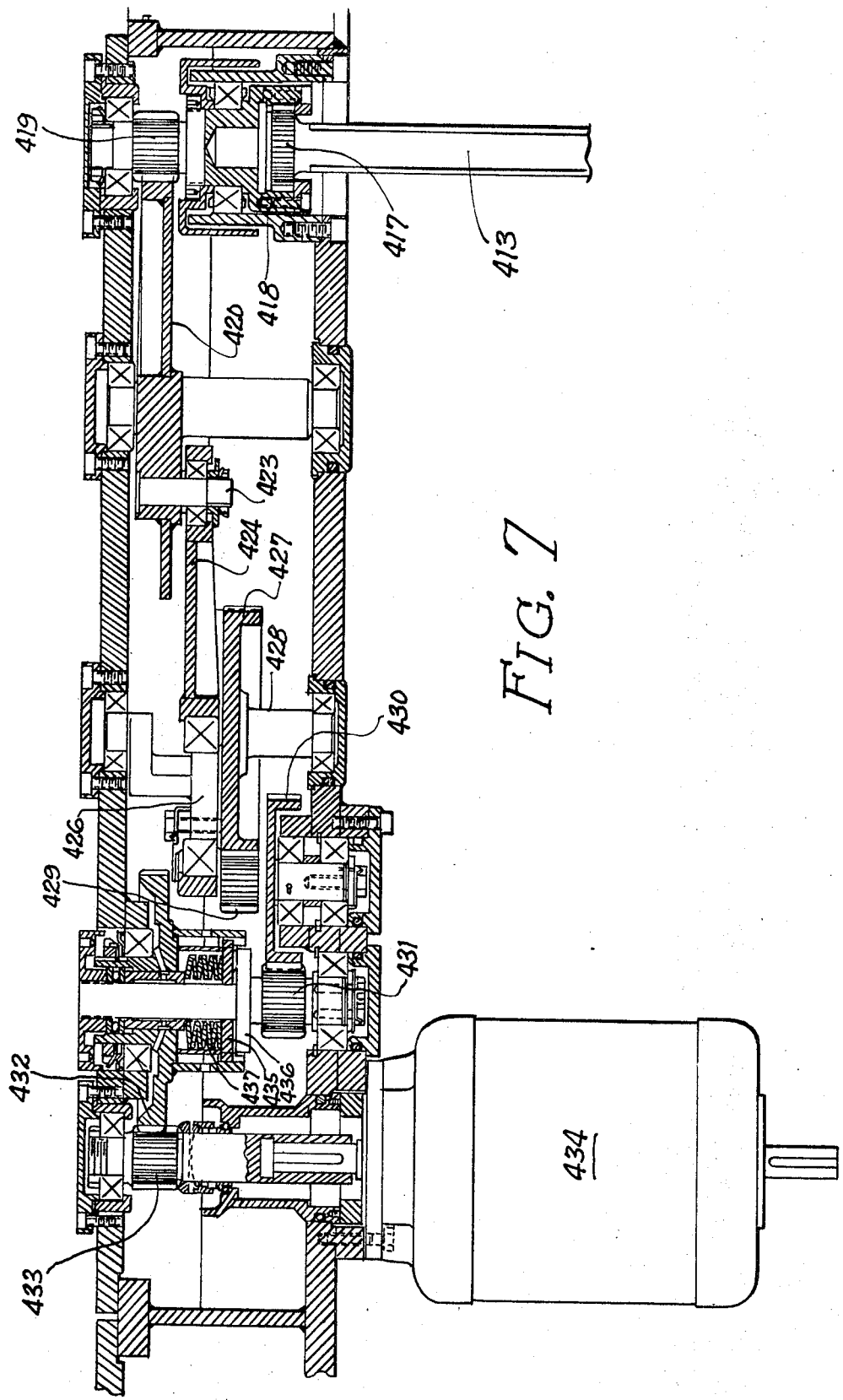
FIG. 7 is an elevational view of still another portion of the device.

The head 417 of the shaft 413 constitutes a male member which engages within and is tied to a corresponding female member 418 (FIGS. 7 and 11). The member 418 carries a gear 419 driven by a toothed sector or quadrant gear 420 which pivots about a shaft 421. The sector 420 is connected at 423 to a rod 424 whose head 425 is eccentrically tied by means of shaft 426 to a gear 427 which rotates at a uniform rate around a shaft 428 separate from the shaft 426. The gear 427 is driven through gears 429 to 433, constituting reduction gearing, by a motor 434. Rotation of the gear 427 will reciprocate the rod 424 back and forth thereby imparting back and forth movement to the quadrant gear and thereby continuously reversing the direction of rotation of the gear 419. A torque-limiting device is formed by a pair of discs 435 and 436 pressed against one another by springs 437. This device protects the motor and the brushing device generally against any overloading.

In considering the above description of the brushing device 400, it will be appreciated that vertical reciprocal movement can be imparted to the brush through operation of the motor 434 through head 417 and shaft 413. The brush is lowered into place through the action of the cable 31 on the bearing member 414.

The bearing member 414 illustrated in FIGS. 9, 10 and 11 is adapted to move vertically up and down with respect to the vertical axis of the tube 110. As shown in FIG. 11, the various operating components are disposed around the vertical axis whereby the entire sub-assembly can be shifted between operative and inoperative positions and whereby the individual elements of the sub-assembly can be individually moved between operative and inoperative positions by the structures described.

Referring to some of the details of FIGS. 8 through 8e, it has been noted that the support 501' carries the assembly of the devices 200, 300, and 400. A plate 502 is insulated by two discs 503 and 504 composed of an insulating material of sufficient mechanical strength, for example "Celoron."

As noted, the other elements comprise a device for rotating and vertically reciprocating a support tube 601 which is tied to the plate 502. An intermediate part of the tube 601 is provided with ribs which engage within internal grooves on a surrounding sleeve 630. The nut 602 on the sleeve 601 is engaged by the screw 603; this is rotated by the sleeve 606 which carries a gear 607 meshing with a gear 610 to constitute reduction gearing driven by an electric motor 609.

The telescopic tubes 613, 614, 616 and 617 protect the lower part of the ribbed tube 601. The telescopic tubes 613, 614 and 616 carry at their upper ends external rings 612, 619 and 620, respectively, and at their lower ends internal rings 615, 618, 621 and 623, respectively. The lower ring 623 of the inside tube is screwed onto the plate 502. The upper part of the outside tube is welded to plate 618 which, along with damping springs 626, is secured to support strap 625. At the end of travel, the damper constituted by the springs 626 prevents any severe shock.

As noted, the gear 631 on tube 630 is driven by a motor 632 provided with an electro-magnetic brake 633 and reduction gears. The motor and its brake and gearing are mounted on chassis 635 which is connected to the support 30 by a recall device constituted by three springs 636 whose compression is regulated by nuts 637 held by lock nuts 638. Nuts 639 adjust the vertical alignment of the device. An annular plate 635' provides the actual means for connection with the vertical member 30' of the support 30.

It will be understood that the operation of the motors 609 and 632 provides for the proper positioning of the various operating devices. For example, the vertical movement which the motor 609 imparts to the support 501 permits raisign and lowering of the support to provide for gripping, positioning and releasing of the pins by the main key 100. The motor 632 imparts rotary movement to the support 501 so that the operating devices such as the auxiliary key 201 and the brush 400' can be moved into position for operation.

All the movements are controlled from the cabin 27 (FIG. 1) through electric cables 640 which connect the various devices to the switch box 11. A cable drum is housed within the girder box 10 and a further cable drum in an adjacent position supplies a cable connection 641 between the switch box 11 and the cabin 27. The cables 640 are connected to the fixed members of switches in the housing 643 and cable 643' connects the movable members of the switches to the junction box 645. A cable 644 links the junction box 645 to the electric motors of the devices 200, 300 and 400. This cable is extended to accommodate movements of plate 501'.

The operation of the apparatus structurally described above is as follows:

The operator in his cabin 27 displaces the bridge 1 by means of the electric motor 19 until the bridge overlies the electrolytic cell whose anode pins are to be raised. The control assembly 2 is then brought by means of the motor 23 into the corridor which separates the series of basins and is there protected from any gas and flame blasts caused by the pin withdrawal.

The operator then loads the pin-carrying baskets 29 onto the platform 28. A lift hook or other device fixed to the main key 100 could be used for this purpose although a completely independent crane could be used for handling the baskets 29. If a lift hook or the like is used, it will have a head of the same design as the head of an anode pin.

The devices of assembly 3 are noramlly in their high positions and the assembly is therefore brought above the selected cell by means of the motor 32 so that the main key 100 is exactly above the first pin to be withdrawn.

The motor 609 is actuated so as to lower the ribbed tube 601 in such a way that the key 100 caps the head of the pin to be drawn. The motor 632 then rotates the assembly of devices 200 and 300 around the shaft 102 until the auxiliary key or wrench 201 is positioned above the head portion for the clamp member which connects the pin stem to its current feed bar.

The motor 309 then actuates the device 300 lowering the key 201 to a position in which the key caps the head. The key 201 is turned by means of the motor 215 which actuates the mechanism 200 until the clamp member is open, and the key is then returned to its upper position by the motor 309.

The operator now acts on the motors 609 and 632 together so that a pulling force and a torque are simultaneously exerted on the pin. Under the effect of these forces, the pin is withdrawn and the operator is able to position it in the empty compartment provided for the pin in one of the pin baskets 29, using the motor 609 for vertical movement and the motor 32 for horizontal movement.

The operator returns the assembly 3 to its position above the location for the new pin and by operating the motors 609 and 632 as well as the cable 301, the brush 400' is moved into position adjacent the area of the current feed bar from which the pin stem has been removed. The motor 434 is operated causing the brush 400' to clean the current feed bar 399 (FIG. 5). The key 100 is actuated by the motor 609 so as to seize a clean pin which is planted within the anode at the prepared position after which the key 201 is brought into position to clamp the pin stem.

The main key 100 operates through engagement over the head of a pin, the pin pushing back the jaws 103 which climb within the tube 101 sliding on the frustoconical surfaces therein. When a sufficient space is left between the jaws 103, they are immobilized, the head of the pin continuing to climb until its lower end has left the jaws. The liberated jaws descend and come together under the pin head, thereby imprisoning the head.

When the key is pulled upwardly, the tightening of the jaws is increased by the sliding on the frusto-conical surfaces. The damper 105 prevents any severe action. When the pin is either re-planted within the anode or placed in one of the baskets 29 and the downward movement of the key 100 is continued, the jaws are freed. It is sufficent then to send a current through the electro-magnet 109 so as to disengage the jaws and to free the pin head.

When the pincer control head has been capped by the auxiliary key 201, current is supplied to a motor 215 which drives the guide member 204 through the reduction gearing 210 to 214, the gear 209 and the clutch plates 206.

The guide member 204 drives the key 201 through the tube 202 so that the pincer member is either opened or shut. The springs 207 which hold the odd and even clutch plates against one another are sufficiently long so that the eventual wear of the clutch plates does not effectively modify the maximum couple which is transmitted through the clutch.

The raising and lowering device 300 acts on the common bearing 414 which engages the ribbed shaft 202 and the tube 407 which carries the brush. The motor 309 drives the drum 303 so as to act on the cable 301, and. drives the drum 303 so as to act on the cable 301, and at the same time of the auxiliary key 201 and the brush 400'.

As explained, the brushing device 400 causes alternating reciprocation of the brush 400'. The motor 434 drives the crank shaft 424 through the gearing 427 and 429–433 and through the clutch device 435, 436. The shaft 424 rotates the gear 420 in alternate directions and transmits this motion to the gear 419 which is integral with the female member 418 is therefore itself rotated in alternate directions and this movement is transmitted to the threaded rod 405 through the gearing 409 and 406.

The tube 403 slides on the internal ribs 404 of the tube 407. The rotation of the threaded rod 405, through engagement with the teeth 403' (FIG. 6), therefore causes rectilinear movement of the tube 403 which is transmitted to the brush. The tube 407 is vertically displaced in response to movement of the bearing 414 since the ribbed telescopic tube 411 is freely movable relative to the shaft 413.

It will be understood that numerous changes may be made in the details of construction, arrangement and operation without departing from the spirit of the invention, especially as defined in the following claims.

That which is claimed is:

1. In a control apparatus for a continuous Soderberg anode having pins projecting into the anode, current feed bars, and pincer members electrically connecting the pins with the current feed bars when in operative position, said apparatus being mounted on carriage means for movement above said anode, the improvement comprising a sub-assembly including a support plate, said sub-assembly also including gripping means mounted on the support plate for withdrawing the pins, pincer actuating means mounted on the support plate for movement between a first operating position for releasing and closing said pincers and a second position away from said operating position, and cleaning means mounted on the support plate for engagement with the current feed bars for cleaning the same, means for movement of said carriage means to the vicinity of an anode, and drive means for moving said sub-assembly toward and away from a location immediately adjacent said anode to provide for operation of said gripping means, said pincer means and said cleaning means; said drive means operating to move said support plate vertically downwardly to said location and vertically upwardly away from said location, and said drive means also operating to rotate said support plate, the vertical axis of said gripping means being coaxially aligned with the rotational axis of said support plate, and said pincer actuating means and cleaning means being located on said support plate in positions outwardly of said rotational axis whereby said pincer actuating means and said cleaning means can be moved around said axis toward and away from operating positions, and including an additional operating device mounted on said support plate, said operating device including means for vertically moving said pincer actuating means and said cleaning means up and down relative to said support plate for moving said pincer actuating means and cleaning means between operative and inoperative positions.

2. A control apparatus as claimed in claim 1 in which the means for movement of the sub-assembly includes a rotatable telescopic tube support.

3. A control apparatus as claimed in claim 2 in which electrical insulation separates the telescopic tube support from the sub-assembly.

4. A control apparatus as claimed in claim 1 which includes control means for the various movements located within a single control station, and means mounting said control station for movement with said carriage means.

5. A control apparatus as claimed in claim 1 in which the pin gripping means includes a key which is adapted to embrace the head of a pin to be withdrawn and jaws within the key member which operate to grip and to release the pin head.

6. A control apparatus as claimed in claim 5 which include means mounting the jaws for sliding movement onto cam surfaces whereby when the pin head is held within the jaws and the key is raised together with the jaws, the gripping relationship is increased.

7. A control apparatus as claimed in claim 1 in which the pincer actuating means includes a pair of coaxial tubular members one within the other, the inner member comprising a driven key and an operative meshing engagement between the inner member and the outer member for driving the inner member responsive to the movement of the outer member.

8. A control apparatus as claimed in claim 1 in which the pincer actuating means and the cleaning means are mounted for vertical movement and are operatively engaged by the same driving mechanism.

9. A control apparatus as claimed in claim 1 in which the cleaning means includes a reciprocal brush, a rotary brush drive and a slider-crank mechanism interconnecting the brush and the drive.

References Cited

FOREIGN PATENTS 684,525  4/1964  Canada.

ROBERT K. MIHALEK, Primary Examiner

U.S. Cl. X.R.

204—243; 212—129; 214—87